United States Patent [19]

Sullivan

[11] Patent Number: 4,466,550
[45] Date of Patent: Aug. 21, 1984

[54] CLOSURE FOR A CYLINDRICAL OPENING HAVING IMPROVED VENTING MEANS

[75] Inventor: James B. Sullivan, Tulsa, Okla.

[73] Assignee: T. D. Williamson, Inc., Tulsa, Okla.

[21] Appl. No.: 426,116

[22] Filed: Sep. 28, 1982

[51] Int. Cl.³ .................... B65D 51/16; F16K 24/04
[52] U.S. Cl. .................................. 220/206; 220/203; 220/315; 220/327; 220/378; 251/322; 251/354
[58] Field of Search ............... 220/203, 206, 327, 315, 220/378; 251/321, 323, 322, 349, 354, 344, 347, 348

[56] References Cited

U.S. PATENT DOCUMENTS

| | | | |
|---|---|---|---|
| 1,424,250 | 8/1922 | Kelly | 251/322 X |
| 1,463,735 | 7/1923 | Varrieuv | 251/322 X |
| 2,192,945 | 3/1940 | Toney | 251/354 X |
| 2,686,652 | 8/1954 | Carlson et al. | 251/354 X |
| 3,294,118 | 12/1966 | Wieden et al. | 251/354 X |
| 3,766,947 | 10/1973 | Osburn | 220/327 |

Primary Examiner—Allan N. Shoap
Attorney, Agent, or Firm—Head, Johnson & Stevenson

[57] ABSTRACT

A closure for a cylindrical opening having improved venting means including a plug body for removably positioning within and sealing a cylindrical opening, the body having an axial opening therethrough and having means when the plug is within the cylindrical opening to seal against pressure, a tubular valve element slidably received in the plug body opening, the element having at least one radial opening adjacent to and spaced from its closed inner end, a spring normally biasing the tubular element towards the plug outer end so that the radial opening is sealed by the wall of the plug member axial opening and a push rod for displacing the tubular element inwardly to expose the radial opening to the interior of the plug body to vent fluid pressure.

4 Claims, 4 Drawing Figures

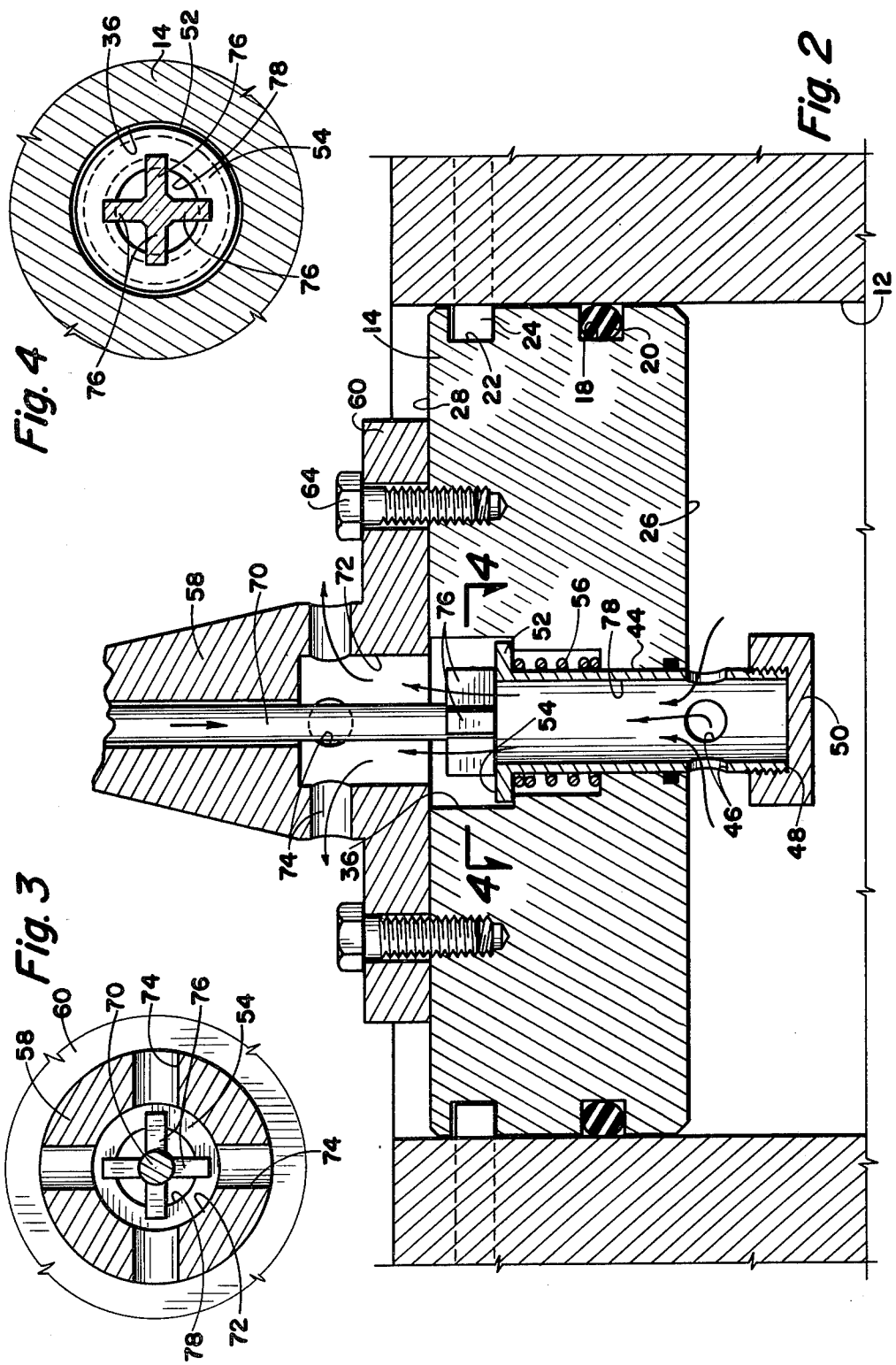

CLOSURE FOR A CYLINDRICAL OPENING HAVING IMPROVED VENTING MEANS

BRIEF SUMMARY OF THE INVENTION

A closure for a cylindrical opening is provided affording an arrangement for venting the pressure through the closure member so that the closure member can be safely removed.

In pipeline work it is frequently necessary to close an opening in a pipeline in a semi-permanent arrangement; that is, so that access can be provided to the interior of the pipeline but in an arrangement wherein the access is not sufficiently frequent to justify the use of a valve structure. A means of enclosing an opening in a pipeline is by use of a plug member positioned in a flange. Reference may be had to U.S. Pat. No. 3,766,947 issued Oct. 23, 1972, Coy D. Osburn, patentee, entitled: "FLUID TIGHT CLOSURE". This patent illustrates and describes a fluid tight closure arrangement for use with pipelines and details the applications for such device. This prior issued patent is incorporated herein by reference and for more explicit information as to the circumstances in which closure members are employed in pipeline operations, reference may be had to such prior issued patent. Briefly, a typical arrangement for closing a pipeline, which can equally as well be applied to any other type of pressurized vessel, employs the use of a flange fitting. Such fitting has a cylindrical opening and the function of the device as set forth in U.S. Pat. No. 3,766,947 is to close such opening. When it is desired to open the opening, that is, remove the closure member, one problem which is encountered is that of pressure differential between the interior and the exterior of the vessel. If a significant pressure differential exists the closure member can be suddenly and violently displaced, creating a dangerous situation.

The closure device as shown in U.S. Pat. No. 3,766,947 includes a means of venting the fluid pressure from the interior to the exterior of the closure member so that pressure can be equalized before the apparatus holding the closure member in place is released. The present invention is directed towards an improved apparatus for venting the closure member which is less expensive to manufacture and more dependable in operation. Further, the present invention provides a venting means affording an increased flow rate so that the time required for equalizing pressure to permit a closure member to be removed can be reduced.

The closure member of the type shown in U.S. Pat. No. 3,766,947 includes means of locking it in position. Reference may be had to co-pending U.S. patent application Ser. No. 263,999 filed May 15, 1981, now U.S. Pat. No. 4,387,740, issued June 14, 1983, entitled: "CAM FLANGE", which discloses an improved locking means for a closure member. The present invention which is directed only to the improved venting means may be successfully employed in connection with the closure member and locking means of co-pending application Ser. No. 263,999.

The closure member is in the form of a plug body having an inner end and an outer end. The plug body has a cylindrical external configuration substantially equal to and just slightly smaller than the internal cylindrical surface to be closed. Means is provided, such as an O-ring type gasket, on the external cylindrical surface of the plug body to seal against the cylindrical opening, and means is provided for retaining the plug body within the cylindrical opening. Such means of retaining the plug body and sealing it are exemplified in copending U.S. application Ser. No. 263,999 and issued U.S. Pat. No. 3,766,947 previously mentioned.

The plug body is provided with an axial opening therethrough, a portion of the opening communicating with the outer end being of larger internal diameter than the portion of the opening communicating with plug inner end forming an internal circumferential ledge.

A tubular valve element is slidably received in the plug axial opening. The external diameter of the valve element is substantially equal to and slightly less than the portion of the axial opening adjacent the inner end of the plug member. The valve element has an enlarged external diameter portion adjacent the outer end and has at least one radial opening (preferably a plurality of such radial openings) in the tubular wall adjacent to and spaced from the element inner end.

A cap member is employed to close the tubular valve element inner end, the cap member also functioning to limit the movement of the valve element as it is urged towards the plug body outer end.

An annular groove is provided within the plug body axial opening adjacent the body inner end. A gasket, such as an O-ring is positioned in the groove, the gasket slidably and sealably engaging the exterior surface of the tubular valve element.

A coiled spring is received on the valve element and is compressibly positioned between the body opening circumferential ledge and the valve element enlarged external diameter portion. The spring urges the valve element towards the plug body outer end to cuase the gasket to engage the valve element between the axial opening and the inner end to thereby close fluid flow through the valve element radial openings. When the valve element is inwardly depressed by force applied against the outer end, the radial openings are exposed to the interior of the plug member to allow the venting of fluid through the valve element and thereby through the plug.

A holder member is affixed to the plug body outer end; the holder member having an axial opening therethrough which is coaxial with the plug body axial opening. A push rod is slidably positioned in the holder member axial opening. The inner end of the push rod is configured to engage the outer end of the tubular element. By depressing the push rod the tubular element may be depressed, thereby permitting the venting of fluid through it. The holder member is provided with an enlarged internal diameter recessed portion adjacent the end which engages the plug body and is provided with a plurality of radial extending passageways. Thus when the tubular element is inwardly depressed, allowing fluid to flow through it, the fluid passes into the enlarged internal diameter portion of the holder and out through the radial openings for venting.

The improved venting means allows for more rapid venting of fluid through the plug than does devices of the prior art, in a device which is relatively economically constructed and extremely dependable in its operation.

DESCRIPTION OF THE DRAWINGS

FIG. 2 is a cross-sectional view as in FIG. 1 showing the device in the open position, permitting the venting of fluid through the closure member so as to equalize pressure to either side of the closure member preparatory to removing the closure member.

FIG. 3 is a cross-sectional view taken along the line 3—3 of FIG. 1 showing the top view of the tubular valve element and showing the configuration of the inward end of the push rod which engages the valve element to displace it when fluid is to be vented through the closure member.

FIG. 4 is a cross-sectional view taken along the line 4—4 of FIG. 2. FIG. 4 shows the cross-sectional arrangement of the lower end of the push rod and, in plan view, the top, or outer end, of the tubular valve element.

DETAILED DESCRIPTION

Figure 1:
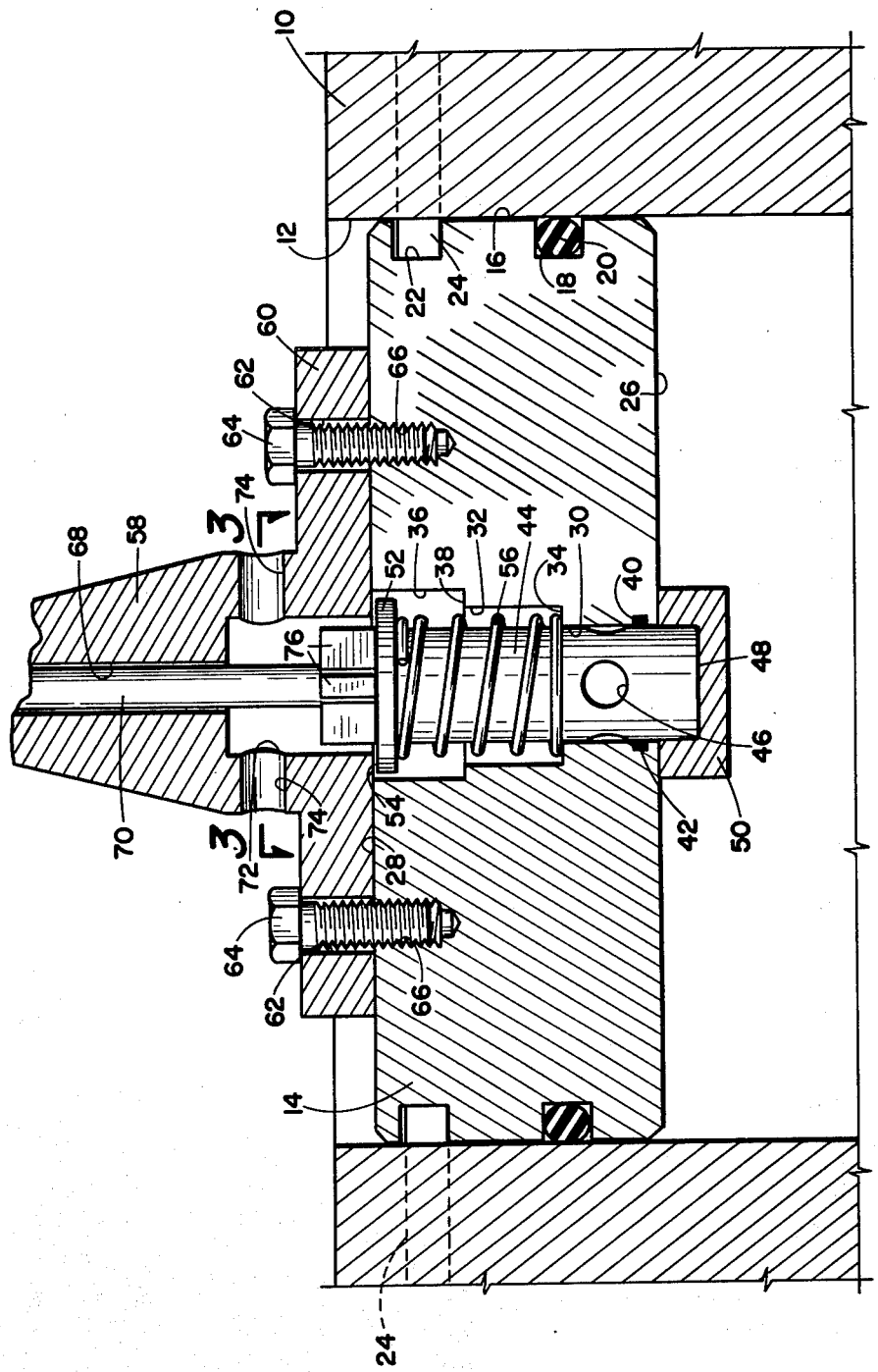
FIG. 1 is a cross-sectional view of a closure for a cylindrical opening according to the invention. The cylindrical opening is typically provided in a flange member or the like; however, the exterior configuration of the device having the cylindrical opening therethrough is not illustrated. The improved venting device of the invention in FIG. 1 is illustrated in its normal, closed, position wherein the flow of fluid is prevented.

Referring to the drawings, and to FIG. 1, an apparatus connected to a pressure vessel is indicated by the numeral 10 and is shown in cross-section. The apparatus 10 is typically a flange fitting or the like, such as illustrated in detail in U.S. Pat. No. 3,766,947 but is exemplary of any device having a cylindrical opening 12 therethrough which is required to be closed against the passage of fluid, whether liquids or gases. For the purpose of closing the cylindrical opening 12, a plug body 14 is employed. The plug body 14 has an external cylindrical surface 16 which is substantially equal to and slightly less than the internal diameter of opening 12. The plug body has means for sealing against the interior of the opening 12 such as by provision of an external circumferential groove 18 having an O-ring gasket 20.

Some means must be provided for retaining the plug member 14 within opening 20 against the force of fluid pressure, which can in some instances be substantial. The previously mentioned U.S. Pat. No. 3,766,947 and co-pending application Ser. No. 263,999 disclose means of accomplishing this in detail. For the purposes of this disclosure, however, it can be stated that such pressure resisting means can generally be accomplished by the provision of a circumferential groove 22 in the external cylindrical surface 16, which removably receives internally projecting members 24. These internally projecting members may be in the form of bolts or other means extending through the flange 10 or may be in the form of retractable ring segments as shown in U.S. Pat. No. 3,766,947.

In any event, the present invention is not directly concerned with the means of holding the plug body 14 in position or the means of sealing it, but, instead, is concerned with improved means of venting pressure through the plug body as required.

The plug body has an inner end 26 and an outer end 28. Thus pressure retained by the fitting 10 is against the interior end 26 whereas the outer end 28 is subject to ambient pressure. The purpose of the invention is to provide means to equalize the pressure against surface 26 with that against surface 28.

The plug body is provided with an axial opening therethrough. In the illustrated arrangement the axial opening is formed by three co-axial portions of different diameters including the axial opening portion 30 communicating with the inner end 26 and intermediate axial opening portion 32. The difference in diameters between the portions 30 and 32 provides an internal circumferential ledge 34. A larger diameter portion 36 communicates with the plug body outer end 28. The difference between the diameters of portions 32 and 36 provides a second circumferential ledge 38. Thus the opening is formed of co-axial portions 30, 32, and 36.

Formed in the axial opening portion 30 is a groove 40 which receives a gasket such as an O-ring 42.

Slidably positioned in the axial opening formed by portions 30, 32, and 36, is a tubular valve element 44. The external dimension of the valve element 44 is substantially equal to and slightly less than the internal diameter of axial opening 30 so that the valve element is slidable in a piston relationship within the opening 30. The tubular valve element is sealed by the O-ring 42 so that the escape of fluid past between the exterior of the valve element and the axial passageway 30 is prohibited.

Formed in the valve element 44, as best seen in FIG. 2 which shows the valve element in cross-section, are a plurality of radial openings 46, which openings are adjacent to but spaced from the valve element inner end 48. When the valve element is in the closed position as shown in FIG. 1, the O-ring gasket 40 engages the exterior of the element between the radial openings 46 and the end 48 to close the fluid flow past the exterior.

A closure cap 50 closes the end 48 of the tubular element. The closure cap 50 is shown in FIG. 2 to be internally threaded to engage external threads on the end of the valve element; however, this is exemplary only. The element 50 may be attached to the valve element 44 such as by means of welding or soldering it in place as in FIG. 1. The closure cap 50 serves the dual function of closing the end of the tubular element 44 and also provides a stop limiting the upward displacement of the element within the axial opening 30.

The tubular valve element 44 is provided with an increased external diameter integral shoulder portion 52 at its outer end 54. The external diameter of the shoulder portion 52 is less than the internal diameter of the axial opening portion 36 but larger than the internal diameter of axial portion 32 so that the shoulder, when the valve element is downwardly or inwardly depressed, engages the ledge 38, thereby providing a limitation to the inward movement of the valve element.

Received about the tubular valve element 44 is a coiled spring 56 which is compressibly received between shoulder 52 and ledge 34. Spring 56 urges the valve element into the upward or outer direction so that fluid flow through the valve element is normally prevented. In addition, it can be seen that fluid pressure within the interior of flange 10 would also normally tend to keep the valve element in the outer or upward position so that the valve is failsafe even against the loss of the force imparted by spring 56.

Attached to the outer end 28 of the plug body is a plug holder 58. The holder is shown with an integral flange portion 60 having spaced openings 62 therein. The openings receive bolts 64 which extend into threaded openings 66 in the plug body outer end 28.

The plug holder has an axial opening 68 therethrough which slidably receives a push rod 70. The axial opening 68 has an enlarged internal diameter portion 72 adjacent the end of the holder which engages the plug body outer surface 28. Communicating with this enlarged internal diameter opening 72 are a plurality (four being illustrated) of radial openings 74.

The inner end of push rod 70 is configured to engage the upper end 54 of the tubular valve element. As illustrated in FIGS. 3 and 4, one such configuration includes integral radially extending flange portions 76. The rod 70 is of external diameter less than the internal diameter of the passageway 78 through the tubular valve element so that the integral flanges 76 provide means to engage the valve element upper end without obstructing the flow of fluid through the passageway 78 when the valve element is downwardly depressed.

FIG. 2 shows the device when in use to equalize fluid pressure past the plug body 14. The push rod 70 is downwardly depressed to expose the radial openings 46 in the valve element 44 past the interior surface 26 of the plug member. Fluid can then freely flow through the openings 46, through the passageway 78 in the valve element, past the push rod flanges 76, into the enlarged internal openings 72 in the plug holder and out through openings 74. When the downward pressure on push rod 70 is released, spring 56 urges the valve back in the upward position as shown in FIG. 1, securely closing it against further fluid flow.

Once pressure differential across the plug body is relieved, the plug body can be safely removed from the flange 10 by retracting the internal projections 24.

The invention provides an improved valve arrangement providing for rapid flow of fluid yet in a manner which is economical of construction and of a high degree of dependability.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A closure for a cylindrical opening having improved venting means, comprising:

a plug body having an inner end and an outer end, the plug body being of cylindrical external configuration for removeable positioning within a cylindrical opening, the plug body having means on the external cylindrical surface to seal against a cylindrical opening wall;

means for retaining the plug body within a cylindrical opening against fluid pressure, the plug body having an axial opening therethrough, a portion of the opening communicating with the plug body outer end being of a larger internal diameter than the portion of the opening communicating with the plug body inner end forming an internal circumferential ledge;

a tubular valve element slidably received in said plug body axial opening, the valve element having an enlarged external diameter portion adjacent the outer end and having at least one radial opening in the tubular wall adjacent to and spaced from the element inner end;

a cap member closing said tubular valve element inner end;

an annular groove within said plug body axial opening adjacent said plug body inner end;

a gasket, such as an O-ring, in said groove slideably and sealably engaging said valve element external cylindrical surface; and a coiled spring receiving said valve element and compressibly positioned between said plug body opening circumferential ledge and said valve element enlarged external diameter portion which urges said valve element outer end towards said plug body outer end to cause said gasket to engage said valve element between said radial opening and said inner end to thereby close fluid flow through the valve element, the valve element being inwardly depressible by force applied against said outer end to expose said radial opening past said plug body inner end to allow the flow of fluid therethrough.

2. A closure for a cylindrical opening according to claim 1 including:

a holder member affixed to said plug body outer end having an axial opening therethrough coaxial with the plug body axial opening;

a push rod slideably received in said holder member;

means on the end of said push rod to engage the outer end of said tubular element whereby the tubular element may be displaced to vent fluid pressure through said plug body, said holder member providing means to position said plug body into and remove it from a cylindrical opening.

3. A closure member according to claim 1 wherein said axial opening through said holder member is of enlarged internal diameter adjacent the end thereof in engagement with said plug body, and including at least one radial opening intersecting such enlarged diameter opening whereby fluid vented through said tubular element will flow through such radial opening.

4. A closure member according to claim 1 wherein said means on the end of said push rod to engage the outer end of said tubular element is of dimensions perpendicular the push rod longitudinal axis greater than the tubular opening in said tubular element and is configured to permit the flow of fluid therepast when said tubular element is inwardly displaced by said push rod.

* * * * *